United States Patent [19]

Maruyama

[11] Patent Number: 4,732,343

[45] Date of Patent: Mar. 22, 1988

[54] HANDLE ATTACHING SCREW ASSEMBLY FOR A FISHING REEL

[75] Inventor: Kenji Maruyama, Hiroshima, Japan

[73] Assignee: Ryobi Ltd., Hiroshima, Japan

[21] Appl. No.: 54,952

[22] Filed: May 28, 1987

[30] Foreign Application Priority Data

May 30, 1986 [JP] Japan .............................. 61-82890[U]

[51] Int. Cl.⁴ .............................................. A01K 89/01
[52] U.S. Cl. ............................... 242/84.2 R; 242/211; 411/6; 411/402
[58] Field of Search ....................... 242/84.1 R, 84.1 J, 242/84.2 R, 84.21 R, 211, 212, 215, 217, 84.5 R, 84.5 A, 84.51 R; 411/6, 7, 384, 396, 402, 410; 292/57, 60, 62

[56] References Cited

U.S. PATENT DOCUMENTS

| | | | |
|---|---|---|---|
| 1,770,751 | 7/1930 | Hall | 292/57 |
| 3,155,412 | 11/1964 | Edgar | 411/910 X |
| 3,179,457 | 4/1965 | Johnson | 292/60 X |
| 4,369,930 | 1/1983 | Noda | 242/84.1 J |
| 4,391,419 | 7/1983 | Iwama et al. | 242/84.5 P |
| 4,572,455 | 2/1986 | Noda | 242/84.1 R |

FOREIGN PATENT DOCUMENTS

| | | | |
|---|---|---|---|
| 58-31501 | 7/1983 | Japan . | |
| 59-156274 | 10/1984 | Japan . | |
| 60-777 | 1/1985 | Japan . | |
| 243274 | 12/1946 | Switzerland | 242/84.5 A |

*Primary Examiner*—Stuart S. Levy
*Assistant Examiner*—Joseph J. Hail, III
*Attorney, Agent, or Firm*—Finnegan, Henderson, Farabow, Garrett & Dunner

[57] ABSTRACT

A screw assembly for attaching a handle and handle shaft to a rotatable drive shaft in a body of a fishing reel. The screw assembly includes a threaded screw for engaging a tapped bore in the drive shaft and an ornamental knob slidable along the screw between a first position wherein rotation of the knob causes rotation of the screw to fix the threaded portion of the screw in the tapped bore and a second position wherein the screw is rotatable with respect to the knob so that the screw may rotate with the drive shaft while the knob remains fixed.

5 Claims, 6 Drawing Figures

HANDLE ATTACHING SCREW ASSEMBLY FOR A FISHING REEL

FIELD OF THE INVENTION

The present invention relates to a screw assembly for attaching the handle of a spinning reel or a fishing reel having a spool shaft supported at both ends, and particularly relates to a screw assembly for attaching a handle to the body of a reel so that the handle can be reattached to either of the right and left sides of the body.

BACKGROUND OF THE INVENTION

In a conventional device for attaching a handle to the body of a spinning or fishing reel having a spool shaft supported at both ends, a polygonal axial hole is provided through a drive shaft, such as the master gear shaft of a spinning reel and the traversing cam shaft of a fishing reel. A handle shaft of polygonal cross section is fitted in the similar polygonal axial hole. An attaching screw is engaged in a tapped hole of the end portion of the handle shaft to secure the handle shaft to the drive shaft so that the handle shaft can be reattached to either of the right and left sides of the body of the reel. One conventional device is shown in FIG. 6, and others are disclosed in Japanese Utility Model Publications Nos. 777/85 and 31501/83 and Japanese Utility Model application No. 156274/84.

In the device shown in FIG. 6, a handle attaching screw b, that is engaged in the end portion of a handle shaft a, and an ornamental knob c are integrally secured to each other so that a gap e is present between the knob c and a handle attaching boss d. Because of the gap e, foreign substances such as water, dust, and sand are likely to enter through the gap e and cause rust and corrosion of the rotary parts. Also, since the ornamental knob c is rotated together with the handle shaft a, it is possible a hand grasping the reel at the knob will be injured or that a fishline will be wound on the rotating knob when the reel is in use.

In each of the devices disclosed in Japanese Utility Model Publication No. 777/85 and Japanese Utility Model application No. 56274/84, the handle attaching screw and the ornamental knob are separately manufactured. A special purpose tool is required to remove the handle attaching screw to change the position of the handle between the right and left sides of the reel body. The handle attaching screw, the ornamental knob, and the special purpose tool are likely to become lost.

In the device disclosed in Japanese Utility Model Publication No. 31501/83, the handle shaft is attached and detached through the pushing of a push button. The push button is likely to be pushed accidentally at times other than the attachment and detachment of the handle shaft so as to cause unwanted disengagement of the handle shaft. Since a wire spring is engaged in the groove of the handle shaft, the handle shaft is then likely to move in the axial direction thereof.

OBJECTS AND SUMMARY OF THE INVENTION

An object of the present invention is the attachment of a drive shaft in a fishing reel in a manner eliminate the above-described problems and disadvantages of the prior art.

Other objects of the present invention are an improved handle attaching screw assembly for a fishing reel which is inexpensive to manufacture, does not require a special mounting tool, and protects rotating parts in the reel from exposure to foreign materials.

These and other objects are attained by a screw assembly for mounting a removable handle in a drive shaft provided in a body of a fishing reel wherein the drive shaft includes a central bore extending therethrough for receiving a handle shaft attached to the handle and wherein the handle shaft has a tapped, axial hole at one end opposite to the other end that is attached to the handle. The screw assembly comprises a rotatable screw having an enlarged head portion, a central body portion, and a threaded end portion adapted to be screwed into the threaded axial bore to retain the handle shaft in the drive shaft, a rotatable knob having a central aperture for receiving the screw and being slidable along the screw between a fixing position wherein the knob and the screw rotate together and an operating position wherein the screw is rotatable with respect to the knob, a spring interposed between the knob and the screw for biasing the knob to the fixing position, and means for retaining the knob in the operating position, wherein during mounting of the handle in the drive shaft the knob is biased into the fixing position by the spring to enable rotation of the knob to rotate the screw such that the threaded end portion mates with the tapped axial bore and during operation of the reel the knob is slid to the operating position and retained thereat by the retaining means to permit rotation of the screw relative to the knob.

BRIEF DESCRIPTION OF THE DRAWINGS

The manner by which the above objects, and other objects, features, and advantages of the present invention are attained will be fully apparent from the following detailed description when it is considered in view of the drawings, wherein.

DETAILED DESCRIPTION

Figure 1:
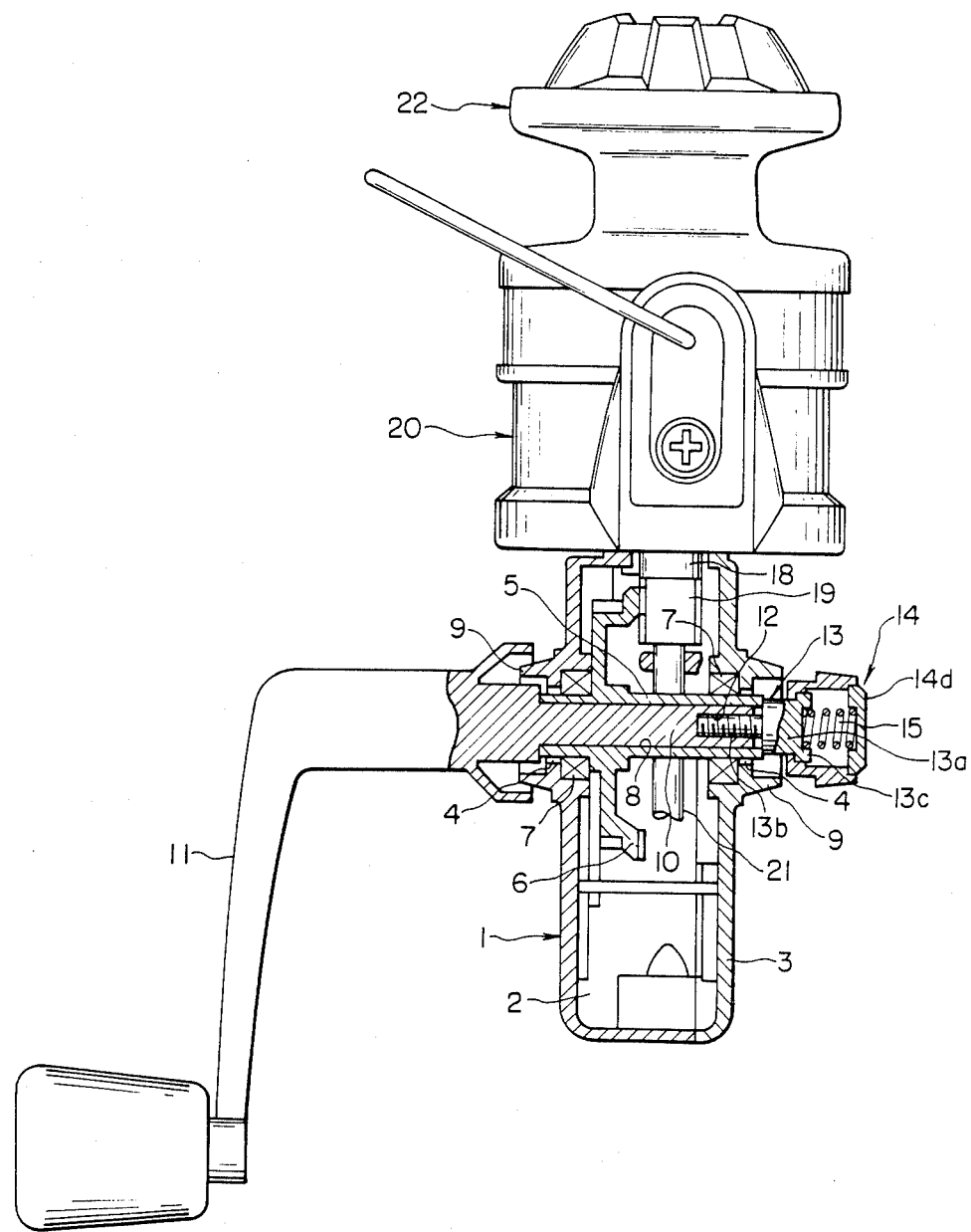
FIG. 1 shows a partial sectional plan view of a first embodiment of a handle attaching screw assembly for a fishing reel according to the present invention.
Figure 2:
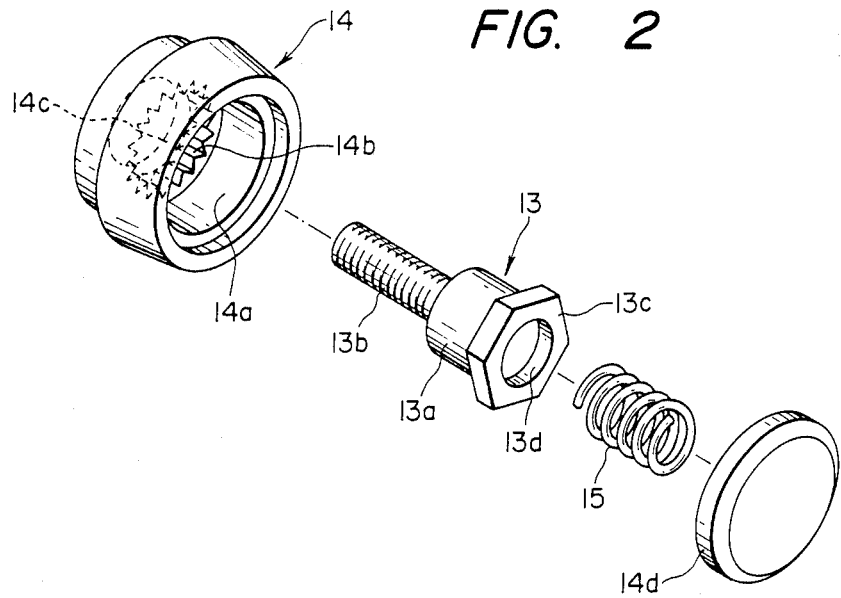
FIG. 2 shows a perspective exploded view of a major part of the embodiment of FIG. 1.

According to the present invention, the handle attaching screw is furnished with a polygonal head and an ornamental knob to be fitted on the screw is provided with a polygonal hole at the inner end of the internal hole of the knob. A spring is interposed between the hand of the handle attaching screw and the ornamental knob to urge the engagement of the polygonal head and the polygonal hole with each other to mate the screw and the knob to each other so that they rotate together. The ornamental knob may be pushed inwardly in the axial direction of the handle attaching screw against the force of the spring so as to slidingly disengage the polygonal head and the polygonal hole from each other.

The ornamental knob is held in the body of a fishing reel when the polygonal head and the polygonal hole are disengaged from each other. Because of the described constitution and operation, the handle attaching screw can be easily detached and reattached by manipulation of the ornamental knob. Except at the time of the detachment or reattachment, the ornamental knob is pushed inward so that the knob and the screw are disengaged from each other so that the knob is fixed in the body of the reel and does not rotate with the handle shaft.

A polygonal axial hole is provided through a drive shaft, a traversing cam shaft, or the like, which is fitted with a master gear and rotatably supported to the body of the fishing reel. The handle shaft of polygonal cross section is fitted in the polygonal axial hole and the handle shaft can be placed at either of the right and left sides of the body of the reel. The handle attaching screw having the polygonal head is engaged in the tapped hole of the end portion of the handle shaft. The ornamental knob having the polygonal hole at the inner end of the internal hole is fitted on the handle attaching screw so that the polygonal hole and the polygonal head can be engaged with, and disengaged from, each other. The spring is interposed between the knob and the screw to urge the knob so that the knob can rotate and slide. The polygonal hole and the polygonal head can be disengaged from each other against the force of the spring to hold the ornamental knob in the body of the fishing reel. The above-described problems and disadvantages are thus eliminated.

Although the handle attaching screw and the ornamental knob are separately manufactured, the spring is interposed between the screw and the knob so that the polygonal head of the screw and the polygonal hole of the knob can be engaged with, or disengaged from, each other and the screw and the knob can be rotated together during the engagement. For that reason, the handle attaching screw can be either tightened or loosened by rotating the ornamental knob by a hand. Consequently, the handle can be removed from, attached to, either of the right and left sides of the body of the fishing reel without using a special tool or the like. Since the handle attaching screw and the ornamental knob are coupled to each other, it is less likely for the assembly to be lost when the handle shaft is detached. After the handle is attached to the body of the fishing reel, the ornamental knob is pushed inward against the force of the spring so that the knob is disengaged from the screw and is held in the boss of the body of the reel. In this position, the the ornamental knob is not rotated when the handle is rotated. This solves the problem that a fishline would be wound on the ornamental knob. Also, since no gap is made between the ornamental knob and the boss of the body of the fishing reel as the knob is held in the boss, dust, sand, sea water, and other foreign materials are kept from entering into a rotary part. Therefore, problems such as improper rotation and corrosion are prevented.

With reference to the drawings, FIG. 1 shows a spinning reel having a hollow body 1 comprising a body portion 2 and a cover portion 3 which abut each other and are secured to each other by screws (not shown). A drive shaft 5 is fitted with a master gear 6 and is rotatably supported by bearings 7 fitted in mutually opposed holes 4 of the body portion 2 and the cover portion 3, so that the drive shaft extends through the body 1 of the spinning reel.

A polygonal axial hole 8, having a cross section shaped as an optional polygon (such as a hexagon), is provided in the drive shaft 5 so that the polygonal hole extends through the axial portion of the shaft. Both the ends of the drive shaft 5 are located in bosses 9 which symmetrically and coaxially project outward from the body portion 2 and cover portion 3 of the reel body 1 and have a larger diameter than the holes 4. The bosses 9 are for mounting an ornamental knob described hereinafter.

A handle shaft 10, which is coupled with a handle 11 and has a polygonally-shaped cross section corresponding to that of the hole 8 of the drive shaft 5, is fitted in the hole 8 so that the handle shaft 10 can be attached and detached to and from either of the right and left sides of the reel body 1 in the axial direction of the drive shaft.

A tapped hole 12 is provided in the center of the tip portion of the handle shaft 10. A handle attaching screw 13 is removably engaged in the tapped hole 12.

Figure 3:
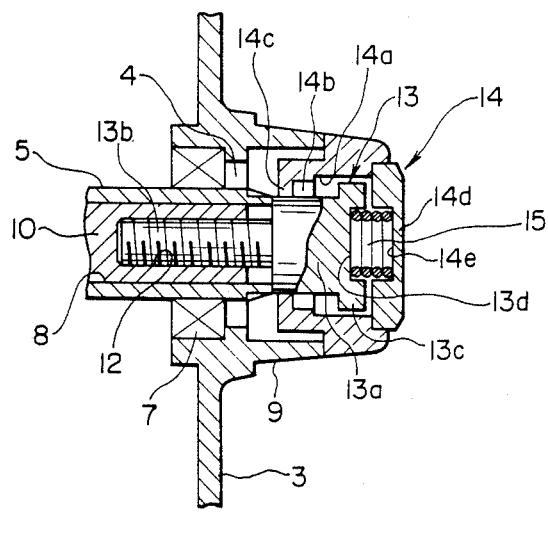
FIG. 3 shows a sectional view of the major part shown in FIG. 2.

As shown in FIGS. 1 and 3, the handle attaching screw 13 comprises a columnar portion 13a, whose diameter is set so as to make it possible to abut the columnar portion to the end of the drive shaft 5, a threaded portion 13b, which has a smaller diameter than the columnar portion and projects from the inner end of the columnar portion coaxially therewith, and a polygonal head 13c which is shaped as an optional polygon such as a hexagon, is provided at the outer end of the columnar portion and has a larger diameter than the columnar portion. A compressed spring 15 is interposed between the handle attaching screw 13 and the ornamental knob 14.

The ornamental knob 14 comprises an internal hole 14a, a polygonal hole 14b, which is provided at the inner end of the internal hole coaxially therewith and is shaped as an optional polygon such as a hexagon to correspond to the shape of the polygonal head 13c, an engaging edge portion 14c tapered inward and provided at the inner end of the polygonal hole, and a cover 14d secured to the outer end of the internal hole by fitting, adhesion or the like and sealing the outer end.

The inside diameter of the engaging edge portion 14c of the ornamental knob 14 is larger than the outside diameter of the columnar portion 13a of the handle attaching screw 13 and smaller than the outside diameter of the polygonal head 13c of the screw. The inside diameter of the internal hole 14a is larger than the outside diameter of the polygonal head 13c. As a result, the ornamental knob 14 and the handle attaching screw 13c. are urged by the spring 15 in opposite directions so as to be moved away from each other in the axial direction of the drive shaft 5 to abut the engaging edge portion 14c to the inner end of the polygonal head 13c to prevent the knob 14 and the screw 13 from being uncoupled from each other in the axial direction of the drive shaft. In addition, the polygonal head 13c and the polygonal hole 14b are engaged with each other as shown in FIG. 1, so that the screw 13 and the knob 14 are kept from being rotated relative to each other around the axis of the drive shaft 5.

In the position shown in FIG. 1, the turning force of the ornamental knob 14 can be transmitted to the handle attaching screw 13 to attach and detach the screw. The ornamental knob 14 can be pushed inward in the axial direction of the drive shaft 5 against the force of the spring 15 during the engagement of the knob 14 and the screw 13 so as to slide inward to disengage the polygonal hole 14b and the polygonal head 13c from each other as shown in FIG. 3, to enable the rotation of the screw 13 around the axis of the drive shaft which the knob 14 remains fixed.

Figure 4:
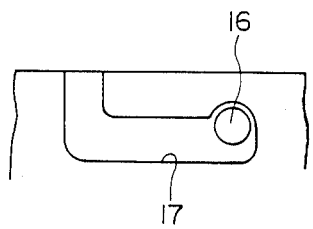
FIG. 4 shows a front view of a means for maintaining the engagement of an ornamental knob in the embodiment of FIG. 1.

When the ornamental knob 14 is pushed inward as described above, the knob is held in the boss 9 of the body portion 2 or cover portion 3 of the reel body 1. To retain the ornamental knob 14 in the boss 9, a retaining means is provided. As embodied herein the retaining means comprises a projection 16 on one of the outside circumferential surface of the inner end portion of the knob and the outside circumferential surface of the boss 9 and a nearly L-shaped groove 17 in the other of the knob 14 and boss 9, as shown in FIG. 4, so as to engage the projection 16. The projection 16 and the groove 17 are engaged with each other by pushing and turning the knob 14.

Recesses 13d and 14e are provided in the central portion of the outer end face of the handle attaching screw 13 and the central portion of the inner end face of the cover 14d of the ornamental knob 14, respectively. The ends of the springs 15 are fitted in the recesses 13d and 14e to support the spring so as not to undergo eccentricity or the like during the rotation of the handle shaft 10.

A quill 18 is rotatably supported in the front portion of the reel body 1. A pinion 19 is provided on the peripheral surface of the inner end of the quill 18 and is engaged with the master gear 6. Also shown in FIG. 1 are a rotor 20, a main shaft 21, and a spool 22.

FIG. 1 shows the handle 11 being attached to the left side of the reel body 1 or to the body portion 2 thereof. When the handle 11 in that state is to be detached and reattached to the right side of the reel body 1, the ornamental knob 14 is disengaged from the boss 9 of the cover portion 3 of the reel body 1, as shown in FIG. 1, so as to be pushed outward by the resilient force of the spring 15 to engage the polygonal hole 14b of the knob and the polygonal head 13c of the handle attaching screw 13 with each other. The ornamental knob 14 is then rotated to detach the screw 13 from the handle shaft 10 by turning the screw 13 in the appropriate direction. The handle shaft 10 can then be removed from the reel body 1.

After the handle shaft 10 is removed from the reel body 1 as described above, the handle shaft may be inserted into the polygonal axial hole 8 of the drive shaft 5 leftward (as to FIG. 1) and the ornamental knob 14 is then rotated to engage the handle attaching screw 13 and the tapped hole 12 of the handle shaft 10 to secure the handle shaft to the drive shaft. The reattachment of the handle 11 is thus completed.

After the handle shaft 10 is secured to the drive shaft 5, the ornamental knob 14 is pushed inwardly against the force of the spring 15 to disengage the polygonal head 13c from the polygonal hole 14b and to hold the knob in the boss of the body portion 2 of the reel body 1. The projection 16 and groove 17 are then engaged to retain the knob 14 against the force of the spring 15. As a result, the handle attaching screw 13 can be rotated together with the handle shaft 10 but the ornamental knob 14 will not be rotated.

Figure 5:
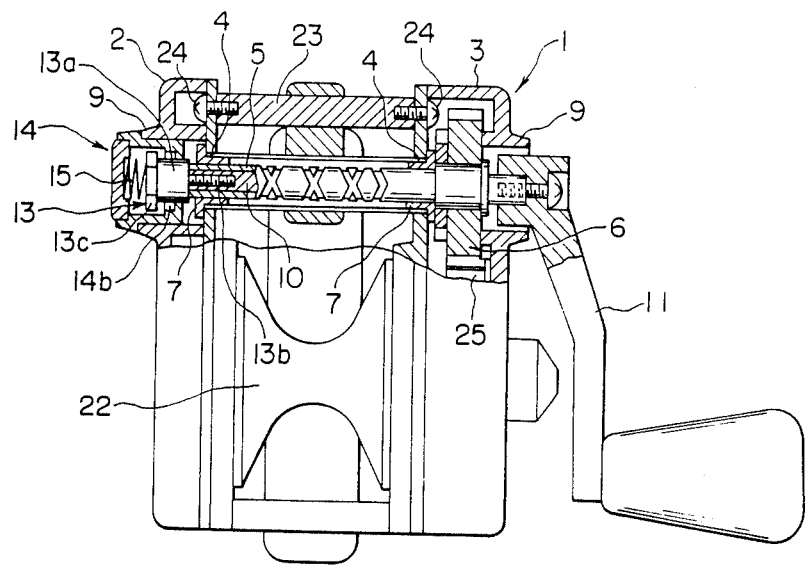
FIG. 5 shows a partial sectional plan view of another embodiment of the handle attaching screw assembly of the present invention.
Figure 6:
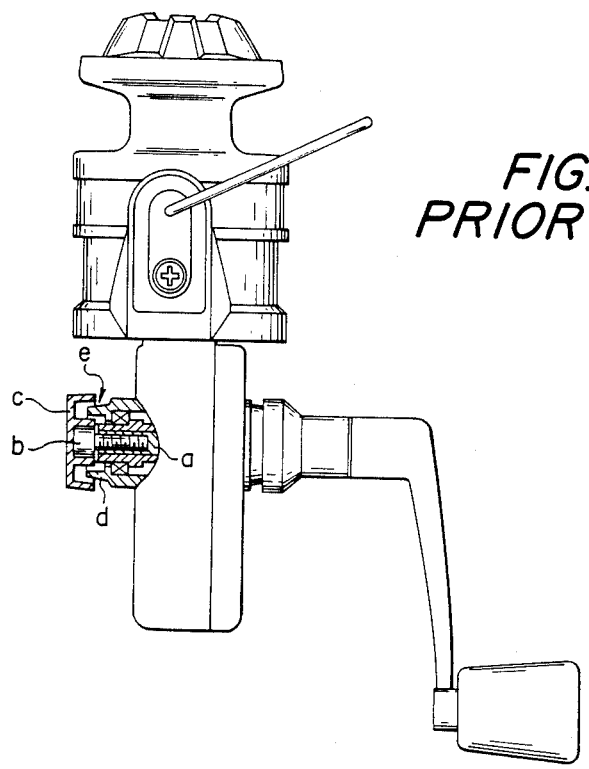
FIG. 6 shows a partial sectional plan view of a conventional device for attaching the handle of a fishing reel.

FIG. 5 shows a fishing reel which has a spool shaft (not shown in the drawing) supported at both ends thereof and to which another embodiment of the present invention is applied. The traversing cam shaft 5 of the fishing reel corresponds to the drive shaft of the spinning reel described above. A handle shaft 10 of polygonal cross section is fitted in the polygonal axial hole 8 of the traversing cam shaft 5 so that the handle shaft can be reattached to either of the right and left sides of the body 1 of the fishing reel.

The body 1 of the fishing reel shown in FIG. 5 comprises right and left side frames 2 and 3 coupled to each other by a coupling bar 23 and screws 24 located at an appropriate distance from each other. The traversing cam shaft 5 is rotatably supported by bearings 7 fitted in the holes 4 of the side frames 2 and 3. A spool 22 is rotatably supported by the spool shaft in parallel with the traversing cam shaft 5. A master gear 6 that is provided on the shaft 5 and a gear (not shown in the drawing) that is provided on the spool shaft are engaged with an intermediate gear 25. Such construction is the same as that of a conventional fishing reel and therefore not described in detail herein.

The handle attaching screw 13, ornamental knob 14 and other members of the fishing reel shown in FIG. 5 are similar to those of the spinning reel shown in FIG. 1.

What is claimed is:

1. A screw assembly for mounting a removable handle in a drive shaft provided in a body of a fishing reel wherein the drive shaft includes a central bore extending therethrough for receiving a handle shaft attached to the handle and wherein the handle shaft has a tapped, axial hole at one end opposite to the other end that is attached to the handle, the assembly comprising:
   a rotatable screw having an enlarged head portion, a central body portion, and a threaded end portion adapted to be screwed into the threaded axial bore to retain the handle shaft in the drive shaft;
   a rotatable knob having a central aperture for receiving said screw and being slidable along said screw between a fixing position wherein said knob and said screw rotate together and an operating position wherein said screw is rotatable with respect to said knob;
   a spring interposed between said knob and said screw for biasing said knob to said fixing position; and
   means for retaining said knob in said operating position, wherein during mounting of the handle in the drive shaft said knob is biased into said fixing position by said spring to enable rotation of said knob to rotate said screw such that said threaded end portion mates with the tapped axial bore and during operation of the reel the knob is slid to said operating position and retained thereat by said retaining means to permit rotation of said screw relative to said knob.

2. A screw assembly according to claim 1, wherein said knob comprises:
   an end cap for closing one end of said central aperture and for engaging one end of said spring;
   an intermediate portion having an inside diameter larger than said outside diameter of said enlarged head portion; and
   a head engaging portion for engaging said head portion of said screw when said knob is in said fixing position.

3. A screw assembly according to claim 2, wherein said head engaging portion of said knob comprises an aperture having a polygonal cross section and said head portion of said screw has a polygonal cross section for mating with said polygonal-shaped aperture of said knob.

4. A screw assembly according to claim 2, wherein said head portion of said screw includes a recess for engaging another end of said spring.

5. A screw assembly according to claim 1, wherein said retaining means comprises a projection extending from one of said knob and the reel body and an L-shaped groove in the other of said knob and the reel body, said projection for being retainingly received in said groove when said knob is in said operating position.

* * * * *